United States Patent Office 2,992,234
Patented July 11, 1961

2,992,234
6,8-(METHYLENEDIOXY)-2,4-OCTADIENOIC ACID AND ITS ALKYL ESTERS

Donald S. Acker, Wilmington, Del., assignor to E. I. du Pont de Nemours and Company, Wilmington, Del., a corporation of Delaware
No Drawing. Continuation of application Ser. No. 560,062, Jan. 19, 1956. This application June 16, 1959, Ser. No. 820,571
5 Claims. (Cl. 260—340.7)

This invention is concerned with a new route to α-lipoic acid and the chemical intermediates involved.

This application is a continuation of my allowed co-pending U.S. application Serial No. 560,062 filed January 19, 1956, now abandoned.

Lipoic acid is a member of the B vitamin group which is involved in the biochemical decarboxylation of α-keto acids. In this role it has been shown to be an essential metabolite for a number of microorganisms. It is also a useful chemotherapeutic agent in the treatment of liver disease (Rausch, Arzneimittelforsch. 5, 32–4 (1955)), and has a beneficial effect on chick growth (De Busk and Williams, Arch. Biochem. Biophys. 55, 587 (1955)).

The known natural sources of lipoic acid do not represent practical starting materials for the preparation of α-lipoic acid because of low yields and the complicated procedures required for isolation. The alternative of chemical synthesis has been explored to some extent, and several synthetic routes have been demonstrated. However, all of these routes involve intermediates which are expensive to obtain or prepare.

This invention has as an object the provision of a new synthetic route to lipoic acid. Another object is the preparation of intermediates for lipoic acid. Other objects will appear hereinafter.

These objects are accomplished by the present invention of 6,8-(methylenedioxy)-2,4-octadienoic acid and its esters, preferably alkyl esters, and their preparation by the acid-catalyzed reaction of formaldehyde with 2,4,6-heptatrienoic acid and its esters.

Lipoic acid is prepared from 2,4,6-heptatrienoic acid and itis esters by reaction of formaldehyde therewith to form 6,8-(methylenedioxy)-2,4-octadienoic acid (or an ester thereof), hydrogenation to the corresponding 6,8-(methylenedioxy)-octanoic acid (or an ester thereof), alcoholysis of the same with an alcohol and an acid catalyst to the alkyl 6,8-dihydroxyoctanoate which upon reaction successively with thionyl chloride and an alkali metal disulfide is converted to an alkyl lipoate which on hydrolysis with aqueous caustic, followed by acidification, yields lipoic acid.

The particular advantage of 6,8-(methylenedioxy)-2,4-octadienoic acid and its alkyl esters as intermediates to lipoic acid is that the 2,4,6-heptatrienoic acid and its alkyl esters from which they are prepared according to this invention are readily synthesized from acetylene and alkyl acrylates as shown by Kalb and Sauer, U.S. 2,540,736.

6,8-(methylenedioxy)-2,4-octadienoic acid and its alkyl esters are also useful as polymerizable dienes. They are converted by heat and/or a polymerization catalyst to thermoplastic solid polymers which on further treatment with crosslinking agents or vulcanization accelerators are converted to insoluble, infusible crosslinked polymers. When a mixture of the thermoplastic form of the polymer with a crosslinking agent is coated from melt or solution on a metal surface and crosslinking is then brought about by baking, a durable enamel coating on the metal is obtained.

The following examples in which parts are by weight are illustrative of the invention.

EXAMPLE I

*Methyl 6,8-(methylenedioxy)-2,4-octadienoate*

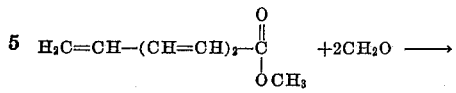

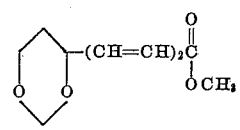

A mixture of 55 parts of purified dioxane, 8 parts of concentrated sulfuric acid, and 6 parts of paraformaldehyde is stirred and cooled to 0° C., and 13.8 parts of methyl 2,4,6-heptatrienoate is added slowly. The mixture is stirred at room temperature for 40 hours, diluted with 100 parts of ice water, and extracted with three 100-part portions of ether. Fractionation of the dried solution affords 4.5 parts of methyl 6,8-(methylenedioxy)-2,4-octadienoate, B.P. 108–115° C. (0.7 mm.); $n_D^{25}$ 1.5180. The light absorption spectrum of an ethanol solution of this compound shows a maximum at 257 millimicrons (molecular extinction coefficient 23,000).

*Analysis.*—Calculated for $C_{10}H_{14}O_4$: C, 60.59%; H, 7.12%. Found: C, 60.14%; H, 7.34%.

The distillation residue from the fractionation noted above is a viscous melt containing polymerized methyl 6,8-(methylenedioxy)-2,4-octadienoate which sets to a solid polymer on cooling.

EXAMPLE II

*Methyl 6,8-(methylenedioxy)-octanoate*

A mixture of 4.3 parts of methyl 6,8-(methylenedioxy)-2,4-octadienoate, 0.5 part of 10% palladium-on-carbon hydrogenation catalyst and 65 parts of hexane is placed in a hydrogenation apparatus and hydrogenated at 35–20 p.s.i. pressure until no more hydrogen is absorbed. The catalyst is filtered, the solvent is distilled, and the product fractionated yielding 3.8 parts of methyl 6,8-(methylenedioxy)-octanoate, B.P. 78° (0.1 mm.), $n_D^{25}$ 1.4508–1.4518.

*Analysis.*—Calculated for $C_{10}H_{18}O_4$: C, 59.41%; H, 8.91%. Found: C, 59.24%; H, 9.00%.

EXAMPLE III

*6,8-(methylenedioxy)-2,4-octadienoic acid*

A mixture of 30 parts of paraformaldehyde, 200 parts of dioxane and 37 parts of concentrated sulfuric acid is cooled to 0° C. and 57.4 parts of 2,4,6-heptatrienoic acid is added. The mixture is stirred at room temperature for 48 hours and then diluted with 200 parts of ice water. The resulting mixture is extracted with three 225-part portions of chloroform. The chloroform extracts are combined, dried over magnesium sulfate, and distilled to remove the solvent. There remains a residue of crude 6,8-(methylenedioxy)-2,4-octadienoic acid in the form of a viscous oil. This residue is dissolved in 160 parts of methanol and hydrogenated in the manner of Example II, using 1 part of 10% palladium-on-carbon catalyst. Both esterification (methanol) and reduction take place in this step. The product comprises 36.8 parts (39% yield) of methyl 6,8-(methylenedioxy)-octanoate.

*Analysis.*—Calculated for $C_{10}H_{18}O_4$: C, 59.41%; H, 8.91%. Found: C, 59.90%; H, 9.11%.

EXAMPLE IV

*Methyl 6,8-(methylenedioxy)-octanoate*

A mixture of 19.5 parts paraformaldehyde, 150 parts dioxane and 25 parts concentrated sulfuric acid is cooled to 0° C., and 44.0 parts of methyl 2,4,6-heptatrienoate is added. The mixture is stirred at room temperature for 42 hours, and 300 parts of ice water is added. The organic layer is separated, and the water layer is extracted with three 100-part portions of ether. The ether extract and organic layer are combined and dried, and the ether is distilled. The residue is diluted with 200 parts of 50% methanol-cyclohexane and hydrogenated over one part of 10% palladium-on-carbon catalyst. The catalyst is filtered, and the residue distilled yielding 30.7 parts of methyl 6,8-(methylenedioxy)-octanoate, B.P. 95° (0.47 mm.)–102° (0.27 mm.), $n_D^{25}$ 1.4490–1.4489.

Methyl 6,8-(methylenedioxy)-octanoate is heated in methanol in the presence of a small amount of sulfuric acid. Methylal is given off, and heating is continued for several hours until no more methylal distills off. The residue is dissolved in benzene and treated with thionyl chloride in the presence of pyridine. The mixture is then quenched in ice and the organic material is taken up in benzene and distilled to yield a yellow oil.

The yellow oil is refluxed in an ethanol solution of sodium disulfide until it is converted to methyl lipoate. The resulting mixture is then heated with aqueous caustic until saponified. Acidification of the mixture yields free lipoic acid which is separated by extraction with benzene and purified by distillation, followed by recrystallization from cyclohexane. It is identified as lipoic acid by assay for pyruvate oxidation factor by the general method of Gunsalus, Dolin and Struglia, J. Biol. Chem. 194, 849 (1952).

The reaction with formaldehyde is generically applicable to 2,4,6-heptatrienoic acid and esters, preferably alkyl esters thereof, i.e., to compounds of the formula

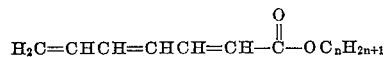

wherein $n$ is a cardinal numeral, e.g., up to 18 or more preferably not greater than 4. By substituting other alkyl 2,4,6-heptatrienoates (i.e., the ethyl, propyl, t-butyl, octadecyl, etc., esters) for methyl 2,4,6-heptatrienoate in Example I, the corresponding alkyl 6,8-(methylenedioxy)-2,4-octadienoates are obtained on reaction with formaldehyde. Aryl and alicylic esters can also be employed, e.g., phenyl, naphthyl, and cyclohexyl 2,4,6-heptatrienoates can be used. The reaction is applicable to any 2,4,6-heptatrienoic acid esters of a monohydroxy hydrocarbon which is aliphatically saturated, i.e., free from non-aromatic unsaturation.

In carrying out the reaction of 2,4,6-heptatrienoic compounds with formaldehyde, it is preferred to employ at least two moles of formaldehyde for each mole of the trienoic compound. The formaldehyde may be introduced as such (i.e., as gaseous monomeric formaldehyde) or as any of the condensed forms of formaldehyde, such as paraformaldehyde or trioxane, which release free formaldehyde under the acidic conditions of carrying out the reaction.

Acidic materials in general catalyze the reaction of 2,4,6-heptatrienoic compounds with formaldehyde. Hydrochloric acid, zinc chloride, boron fluoride/water complexes, phosphoric acid and the like may be employed. However, mineral acids are preferred, particularly sulfuric acid, because its use is accompanied by a minimum of side reactions. Organic acids may also be used. For example, methyl 2,4,6-heptatrienoate may be hydrolyzed in aqueous sodium hydroxide and the resulting 2,4,6-heptatrienoic acid isolated by acidifying the mixture with hydrochloric acid, taking up the organic material in benzene and evaporating the benzene layer. The free acid (melting point 90–100° C.) is dissolved in dioxane, and an excess of gaseous monomeric formaldehyde is bubbled into the solution to yield a dioxane solution of 6,8-methylenedioxy-2,4-octadienoic acid. The acid serves as a catalyst for the reaction. The free 6,8-(methylenedioxy)-2,4-octadienoic acid is obtained by evaporation of the dioxane.

As indicated above, the use of an organic solvent in the process of preparing 6,8-(methylenedioxy)-2,4-octadienoic acid and its esters according to this invention is not essential. However, the use of a solvent permits better control of the rate of reaction and therefore is preferred. Suitable solvents include the saturated hydrocarbons, such as benzene, pentane, cyclohexane and the like; halogenated hydrocarbons, such as chloroform, tetrachloroethane, chlorobenzene and the like; and ethers, such as diethyl ether, tetrahydrofuran, dioxane and the like.

Temperature is not a critical factor in the process of this invention, and 2,4,6-heptatrienoic acid and its esters will react with formaldehyde to form 6,8-(methylenedioxy)-2,4-octadienoic acid and its esters over a wide range of temperatures above and below room temperature. However, for practical purposes, and to minimize side reactions, it is preferred to carry out the reaction in the temperature range of 0–50° C., and particularly in the range of 0–25° C. Pressure may be varied above and below atmospheric pressure during this reaction. When gaseous monomeric formaldehyde is employed, it is sometimes desirable to use elevated pressure. Otherwise there is no advantage to operating at pressures other than atmospheric pressure.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Methylenedioxyoctadienoic compounds of the formula

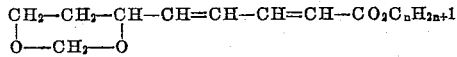

wherein $n$ is a cardinal number of 0 to 18, inclusive.

2. A 6,8-(methylenedioxy)-2,4-octadienoic acid ester of a monohydroxy hydrocarbon of 1–18 carbons which is aliphatically saturated.

3. 6,8-(methylenedioxy)-2,4-octadienoic acid.

4. Process for the preparation of 6,8-(methylenedioxy)-2,4-octadienoic acid and alkyl 6,8-(methylenedioxy)-2,4-octadienoates wherein formaldehyde is reacted at a temperature of 0–50° C. and under acidic conditions with a compound of the formula

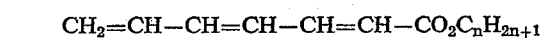

wherein $n$ is a cardinal number of 0 to 18, inclusive, the formaldehyde and said compound being in the ratio of at least two moles of formaldehyde per mole of triene.

5. Process wherein a member of the group consisting of 2,4,6-heptatrienoic acid and esters thereof with monohydroxy hydrocarbons of 1–18 carbons free of non-aromatic unsaturation is reacted with formaldehyde at from 0–50° C. under acidic conditions.

No references cited.